United States Patent

Krigbaum et al.

[11] Patent Number: 6,026,337
[45] Date of Patent: Feb. 15, 2000

[54] MICROBOLOMETER EARTH SENSOR ASSEMBLY

[75] Inventors: William Gordon Krigbaum; Shu-Jone Lee; Albert Yukio Okamoto, all of San Jose; George Teiichi Sakoda, Sunnyvale, all of Calif.

[73] Assignee: Lockheed Martin Corporation, Sunnyvale, Calif.

[21] Appl. No.: 08/928,981

[22] Filed: Sep. 12, 1997

[51] Int. Cl.$^7$ ...................................................... G05D 1/00
[52] U.S. Cl. ........................... 701/13; 701/226; 244/171; 250/203.6
[58] Field of Search ................................. 701/13, 4, 222, 701/226; 702/150, 152, 153; 244/3.16, 3.17, 3.18, 171; 250/203.1, 206.1, 206.2; 356/141.5, 139.03, 139.01

[56] References Cited

U.S. PATENT DOCUMENTS

| | | | |
|---|---|---|---|
| 5,129,595 | 7/1992 | Thiede et al. ........................... | 244/3.16 |
| 5,189,295 | 2/1993 | Falbel .................................... | 250/206.2 |
| 5,257,760 | 11/1993 | Savoca ................................... | 244/171 |
| 5,337,241 | 8/1994 | Takahashi .............................. | 364/434 |
| 5,412,574 | 5/1995 | Bender ................................... | 244/171 |
| 5,556,058 | 9/1996 | Bender ................................... | 364/455 |
| 5,585,633 | 12/1996 | Tulet ..................................... | 250/338.3 |
| 5,721,431 | 2/1998 | Hersom et al. ......................... | 250/342 |
| 5,744,801 | 4/1998 | Diedrickson ........................... | 250/349 |
| 5,811,808 | 9/1998 | Cannata et al. ........................ | 250/332 |
| 5,837,894 | 11/1998 | Fritz et al. ............................. | 73/178 R |
| 5,903,007 | 5/1999 | Savoca ................................... | 250/342 |

OTHER PUBLICATIONS

SPIE Conference, Jul. 12, 1995, San Diego, "Dual Use, Low Cost Uncooled Microbolometer Imaging System", by N. Butler, R. Blackwell, R. Murphy, R. Silvia, and C. Marshall.
Wood et al.; Integrated Uncooled Infrared Detector Imaging Arrays; IEEE 1992; pp. 132–135.
Alex et al.; On–Board Correction of Systematic Error of Earth Sensors; IEEE, vol. 25, Iss. 3; May 1989; pp. 373–379.

*Primary Examiner*—Michael J. Zanelli
*Attorney, Agent, or Firm*—Feix & Feix

[57] ABSTRACT

An earth sensor assembly for an orbiting spacecraft which includes a two dimensional microbolometer area array detector as the detective source for capturing full or partial infrared (IR) images of the earth. The earth sensor assembly further includes an input optic head assembly for collecting incident radiant power emitted from the earth and for directing it to a focal plane of the microbolometer area array. The microbolometer detector converts the detected radiant power into electric signals. Also included are sensor electronics and data processing means for processing the converted signals and determining the attitude of the spacecraft relative to the earth. Also disclosed is an algorithm for processing the earth image information generated by the microbolometer area array and for determining the three axis attitude (pitch, roll and yaw) of the spacecraft.

19 Claims, 12 Drawing Sheets

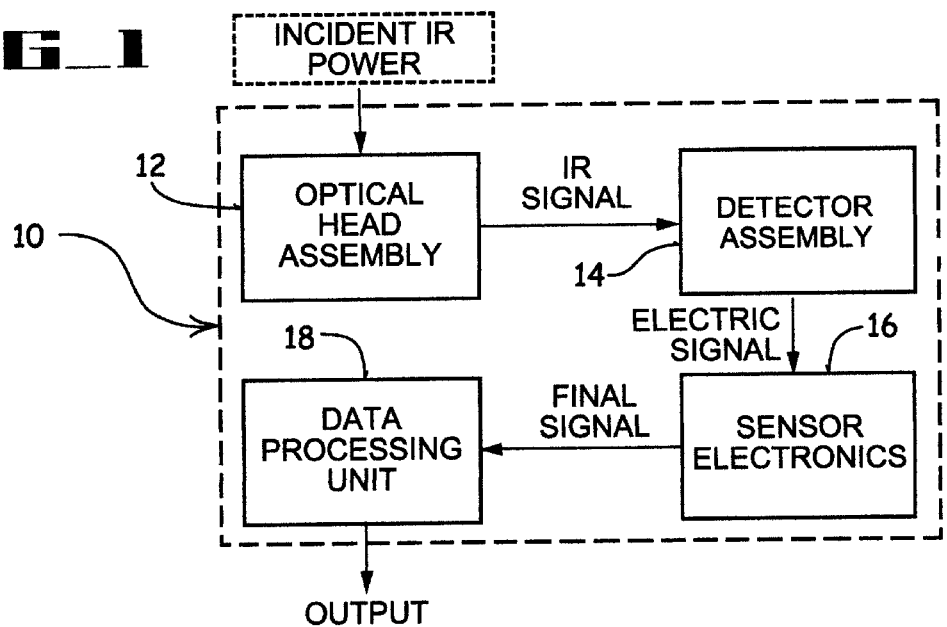
FIG_1
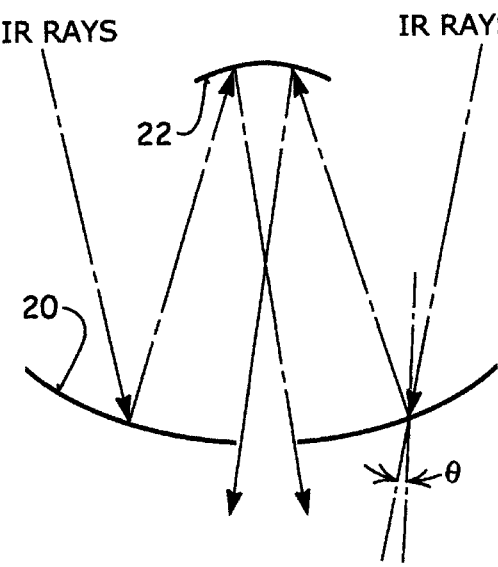
FIG_4
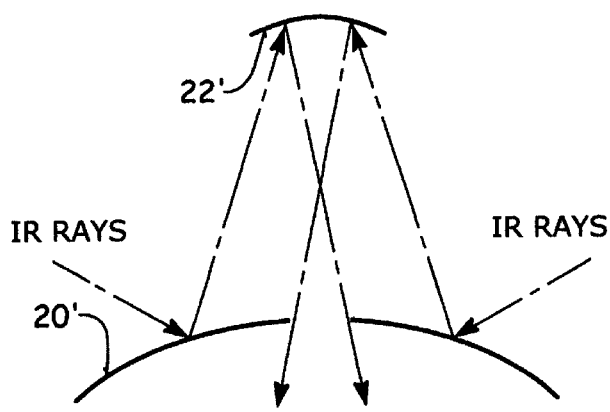
FIG_6

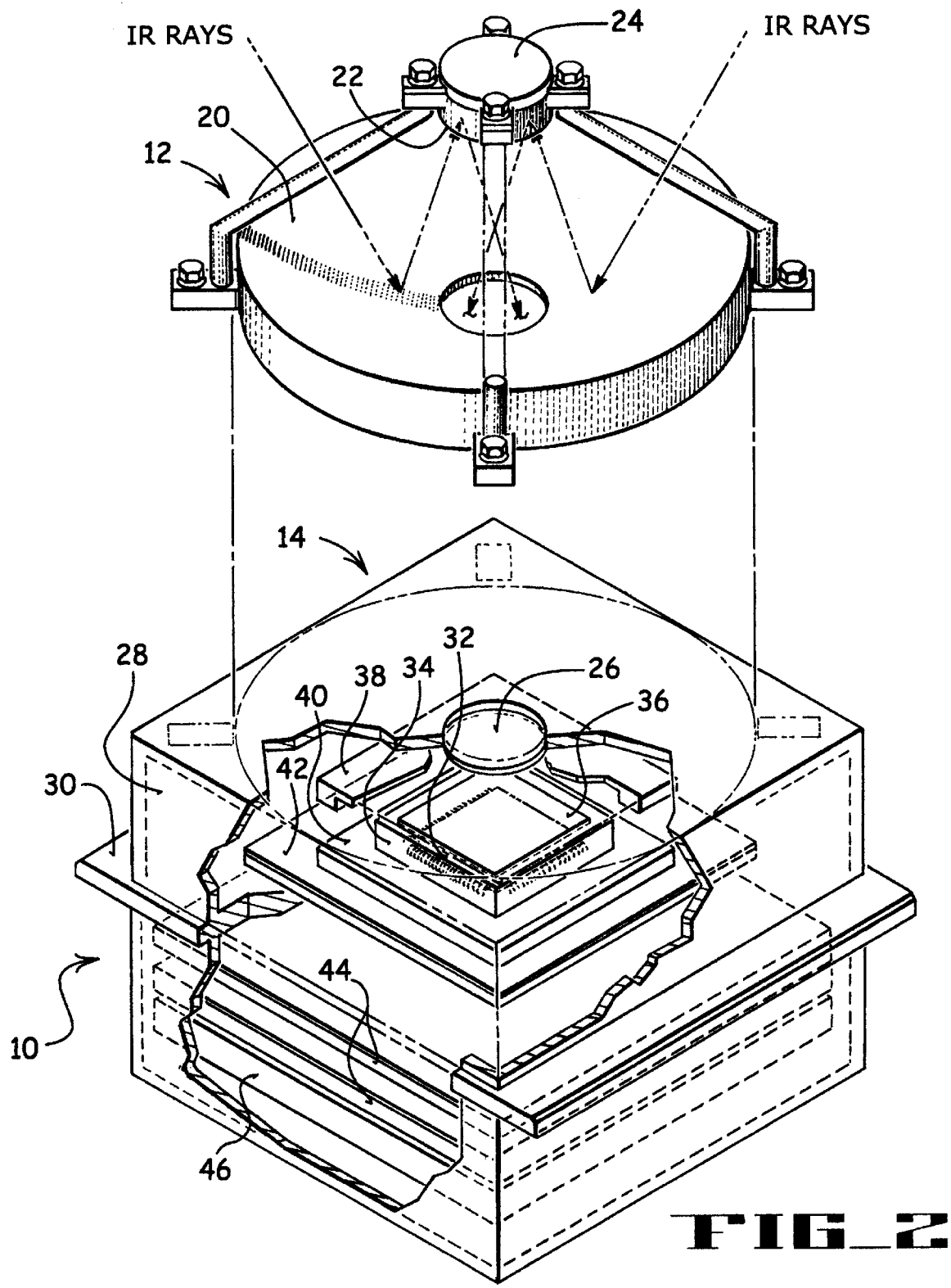
FIG_2

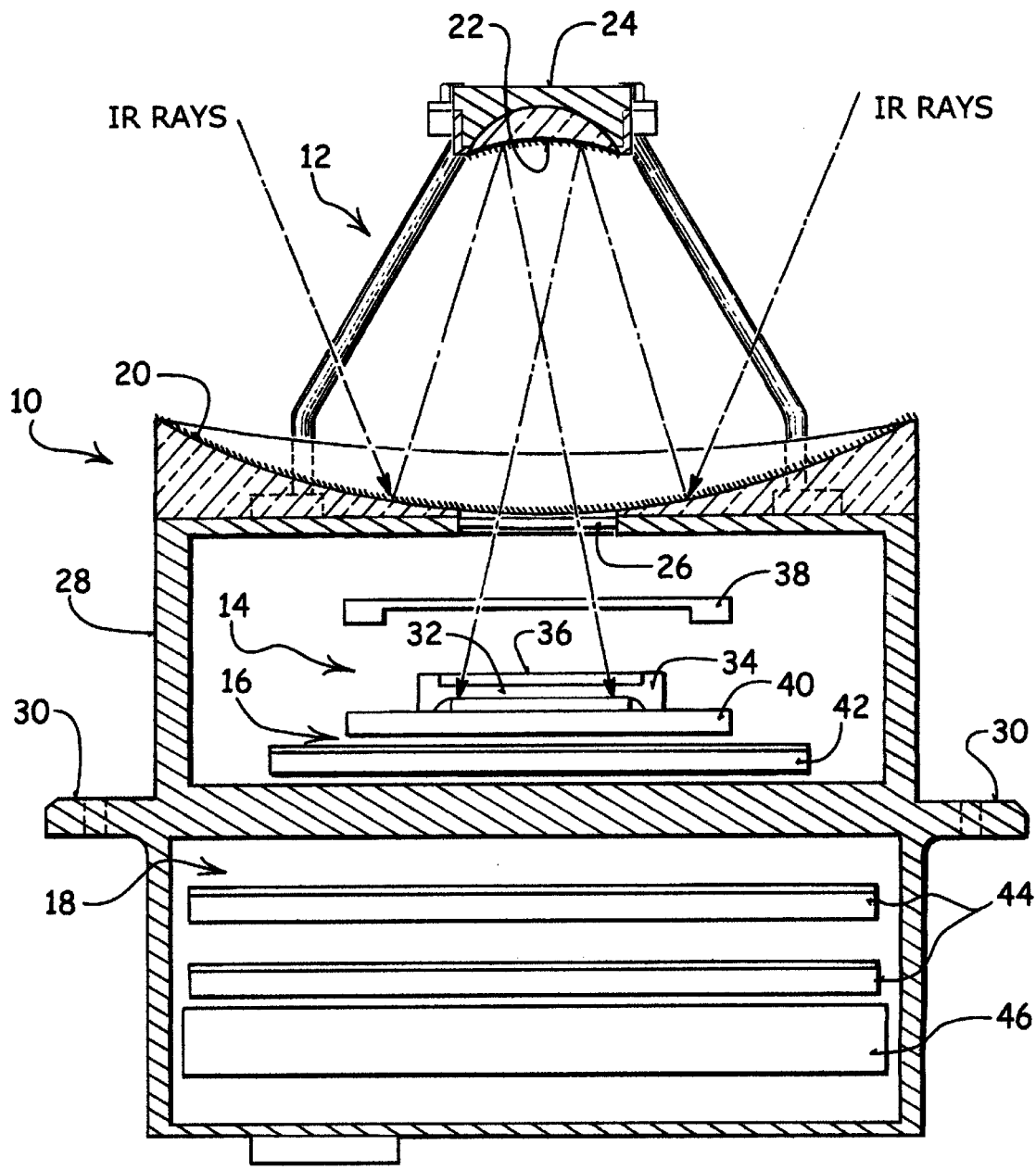

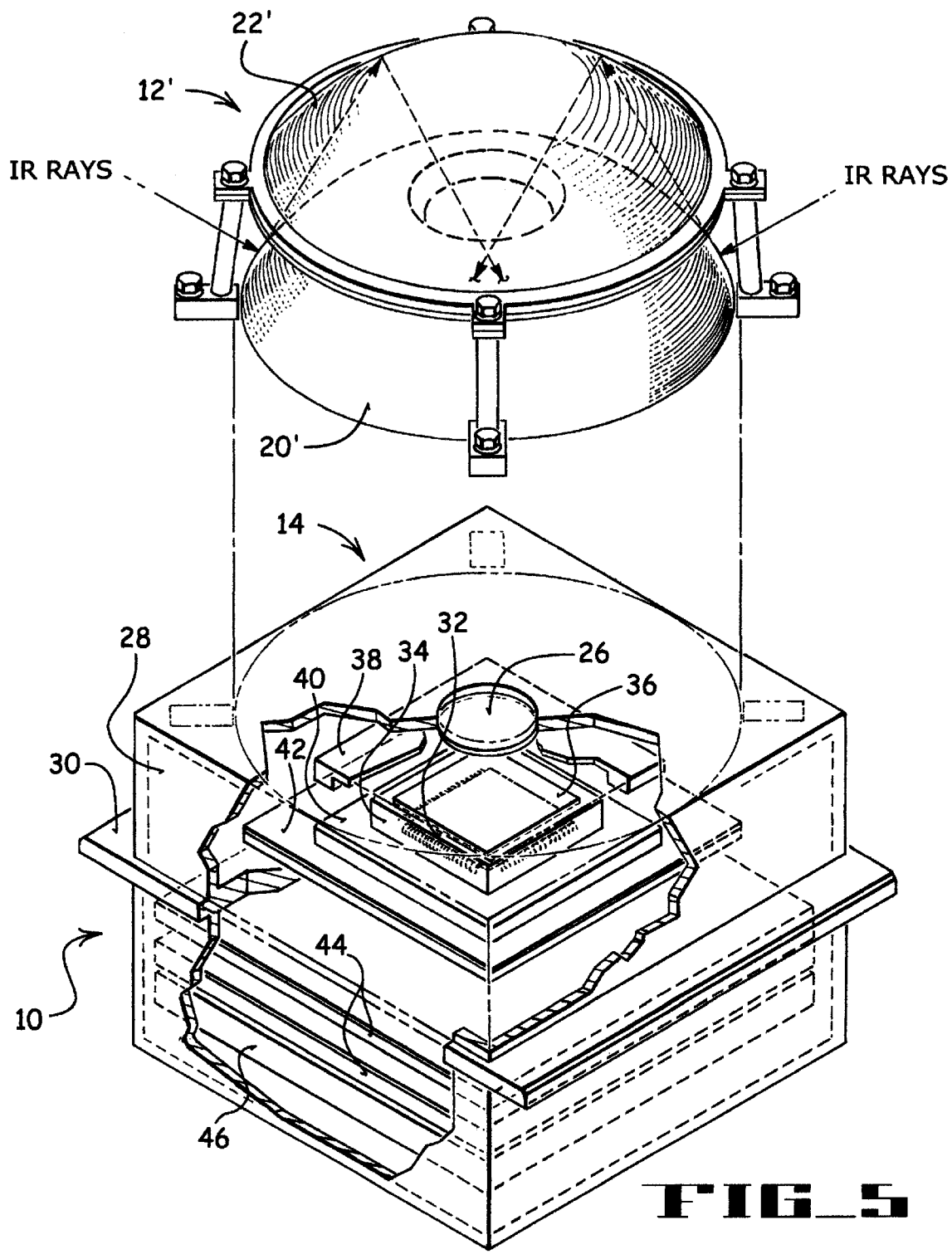
FIG_5

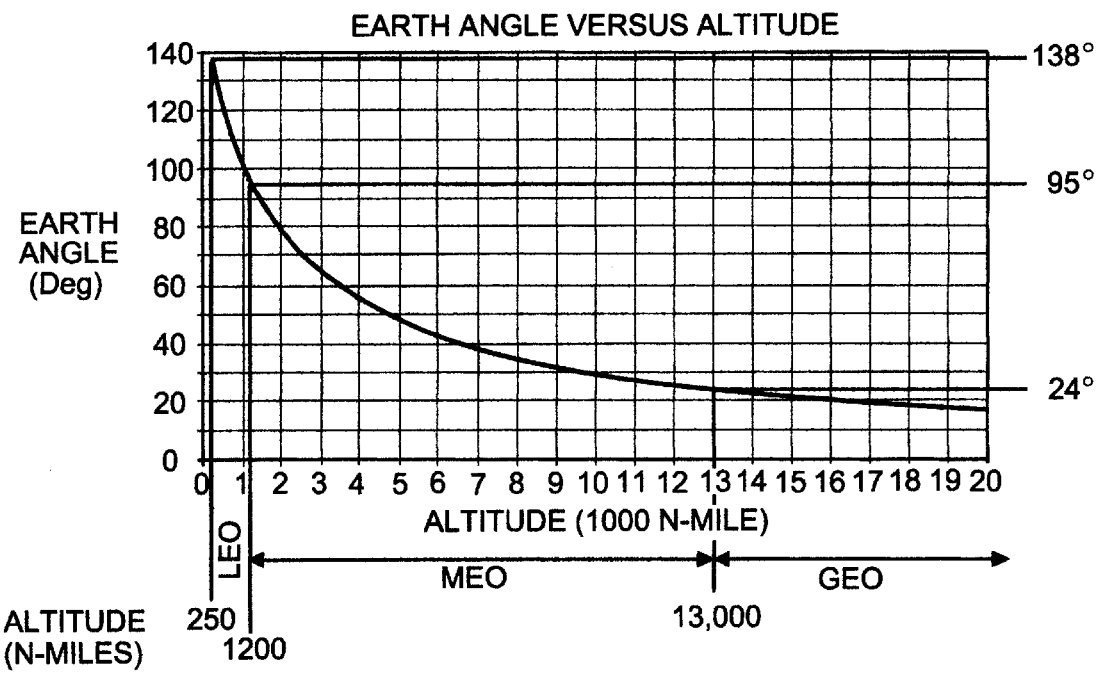
FIG_6A
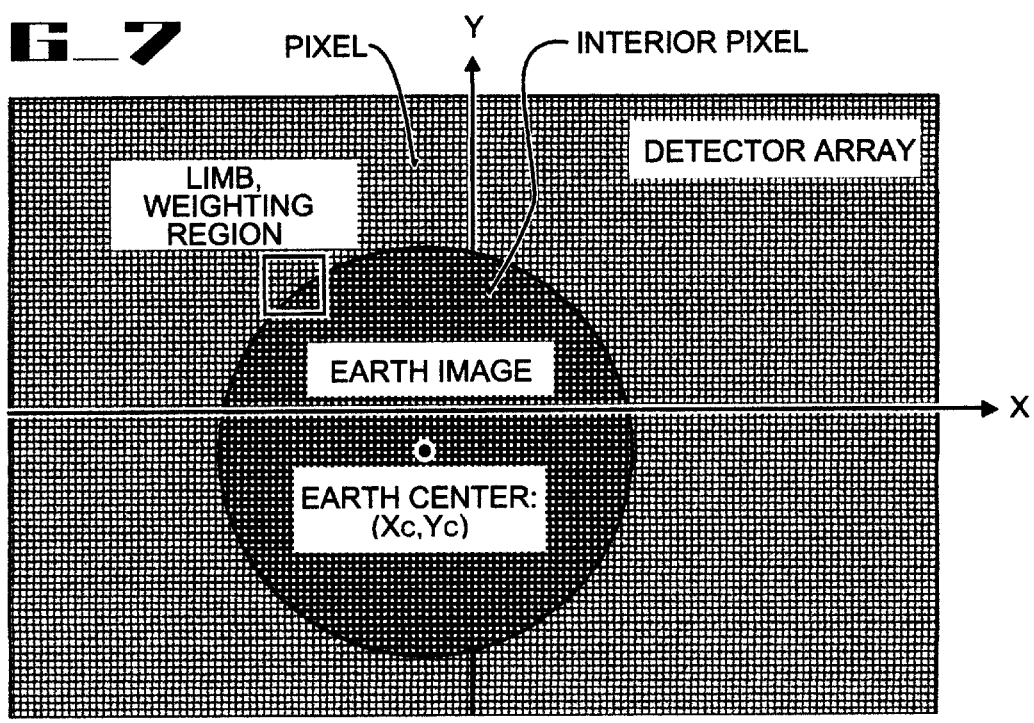
FIG_7

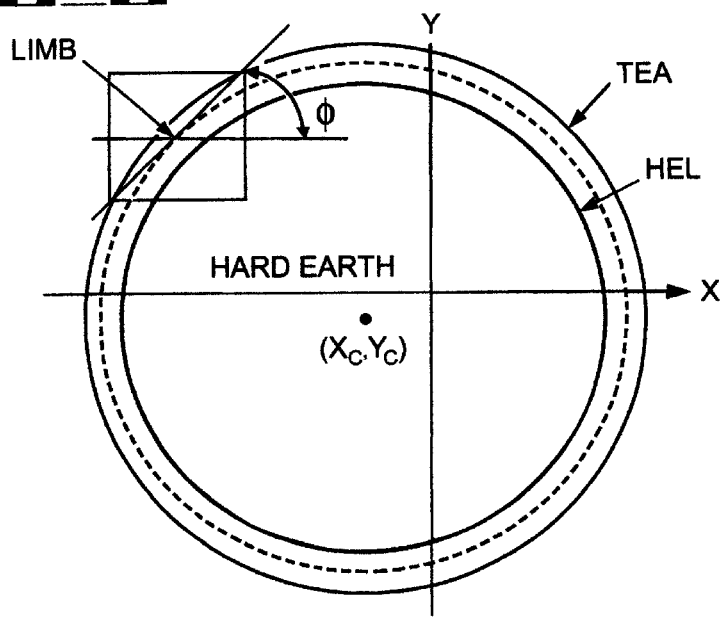
FIG_8
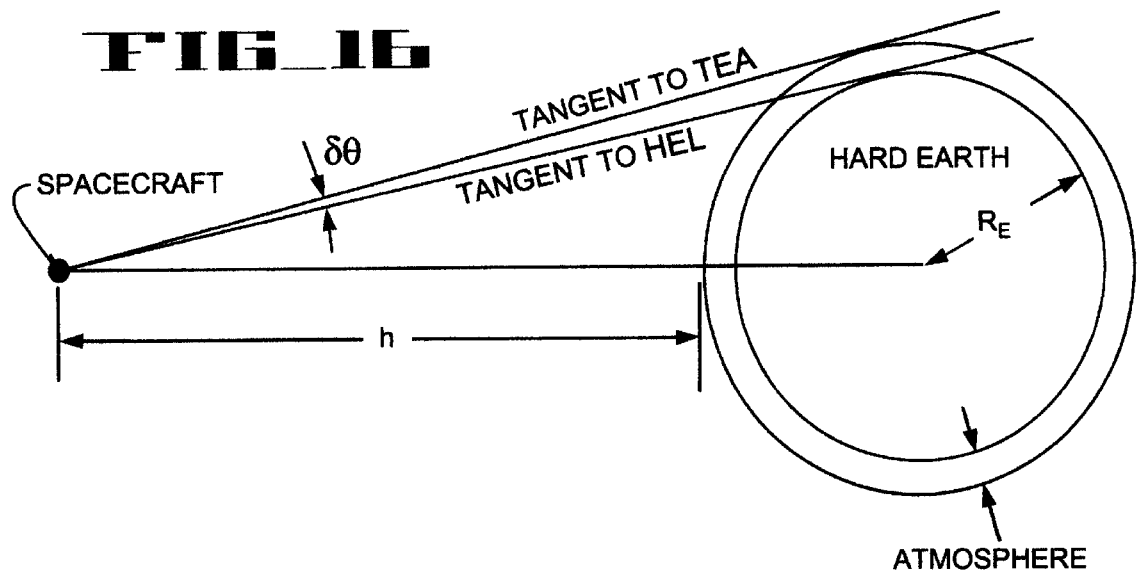
FIG_16

FIG_9
SAMPLE CASE: EARTH AQUIRED
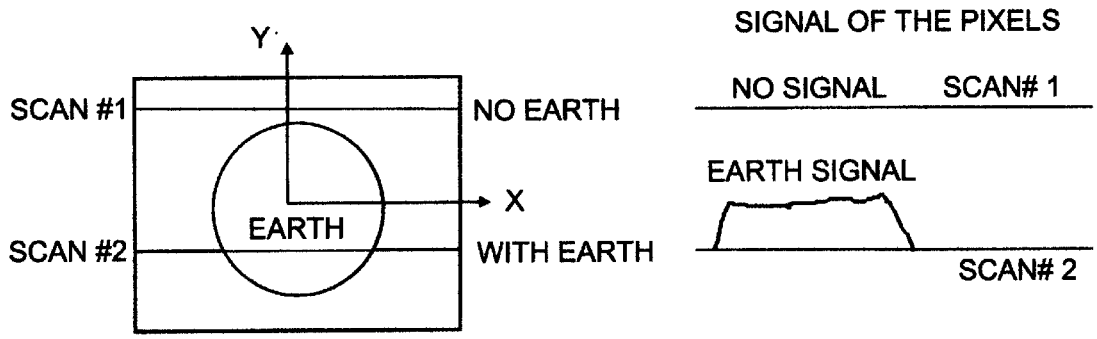
FIG_10
SAMPLE CASE: EARTH PARTIALLY ACQUIRED
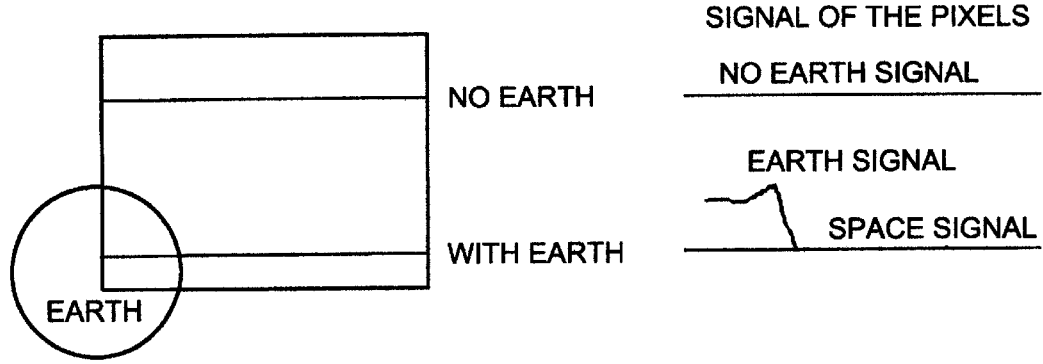

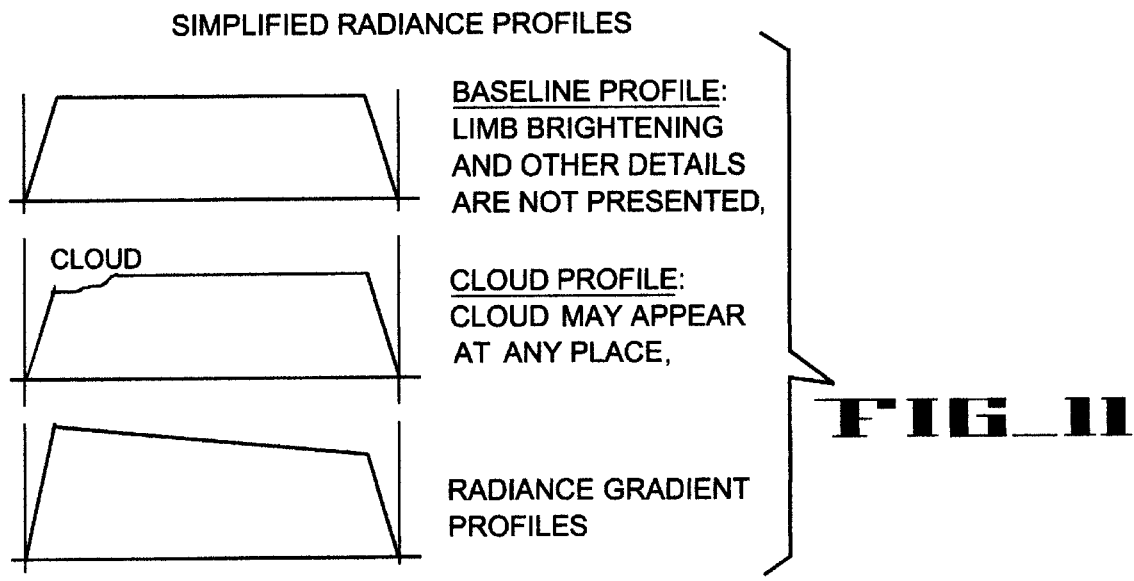
FIG_11
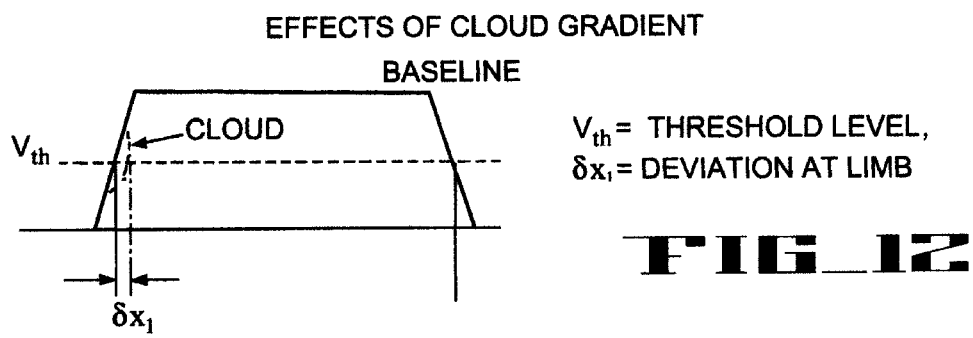
FIG_12
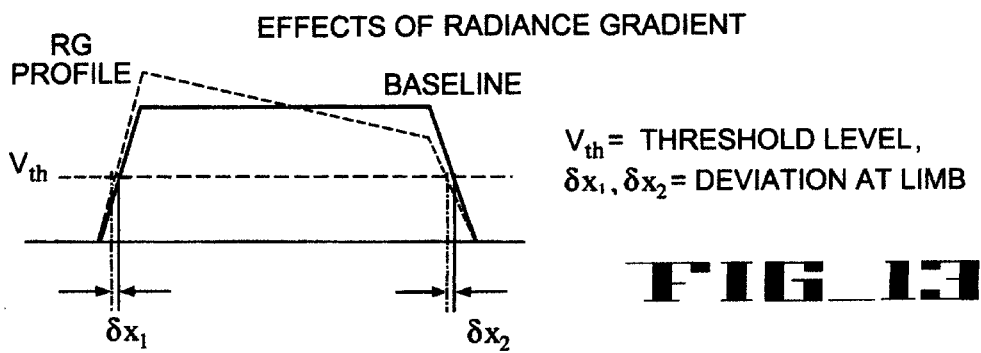
FIG_13

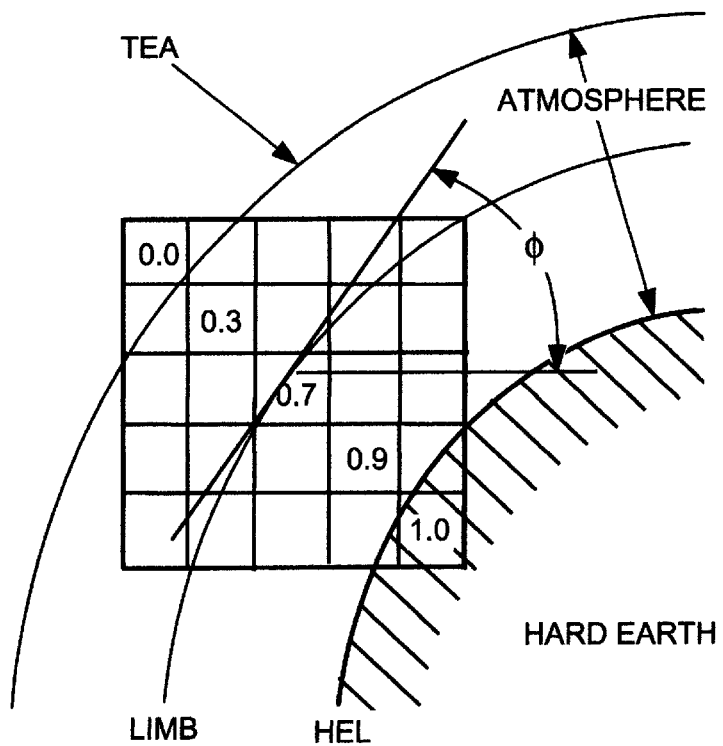
FIG_14
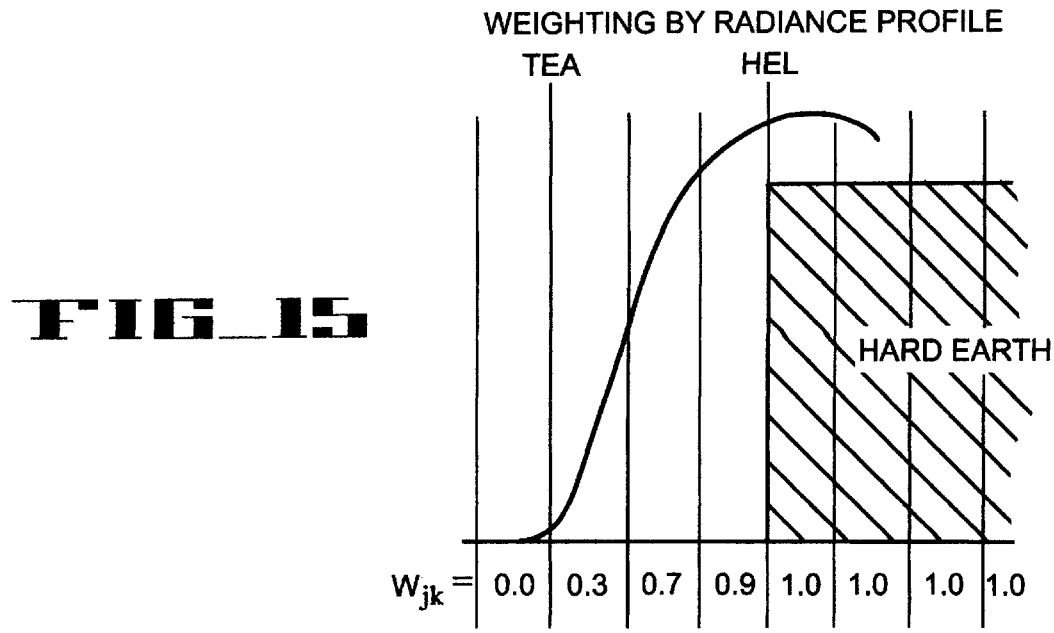
FIG_15

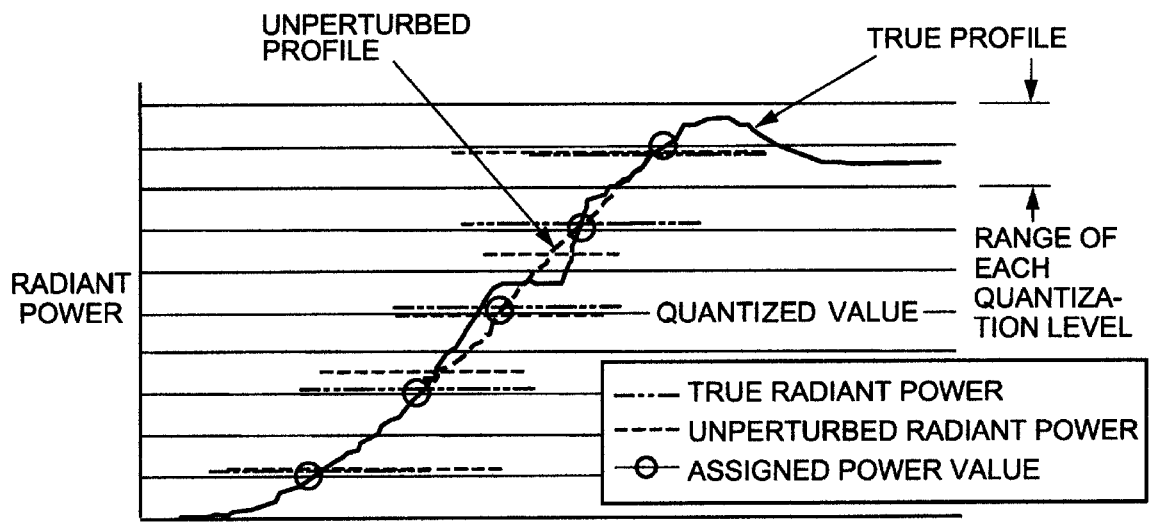
FIG_17
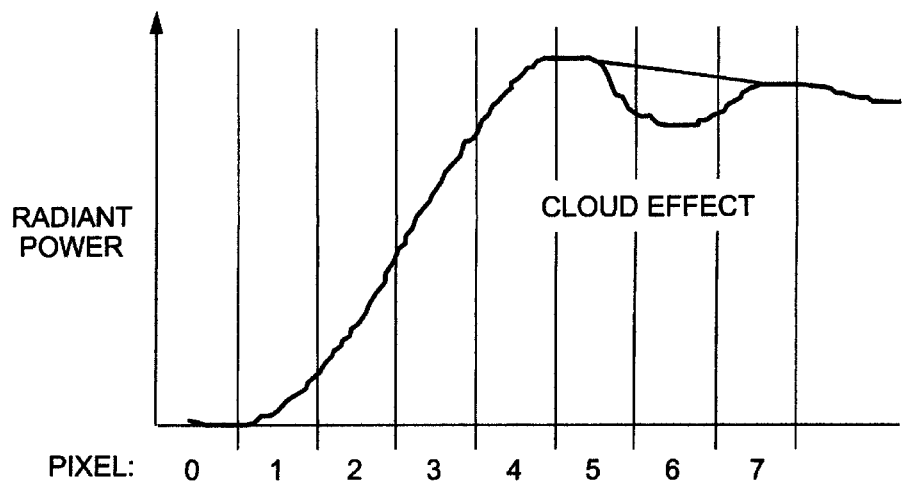
FIG_18

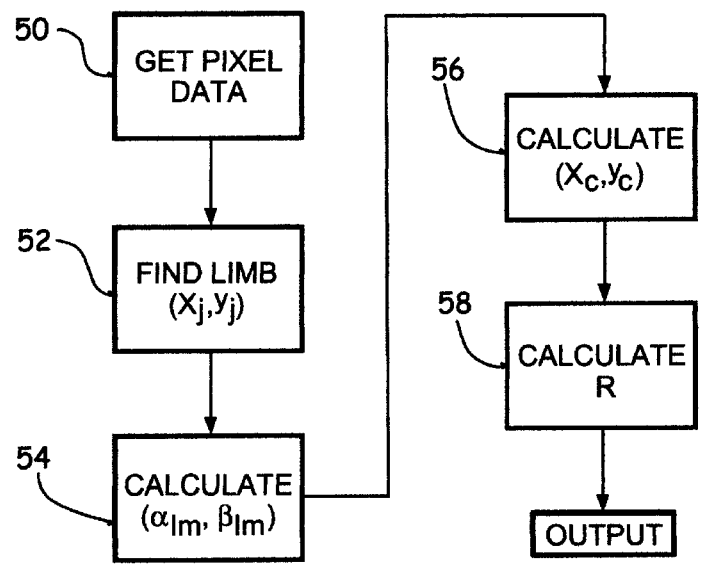
FIG_19
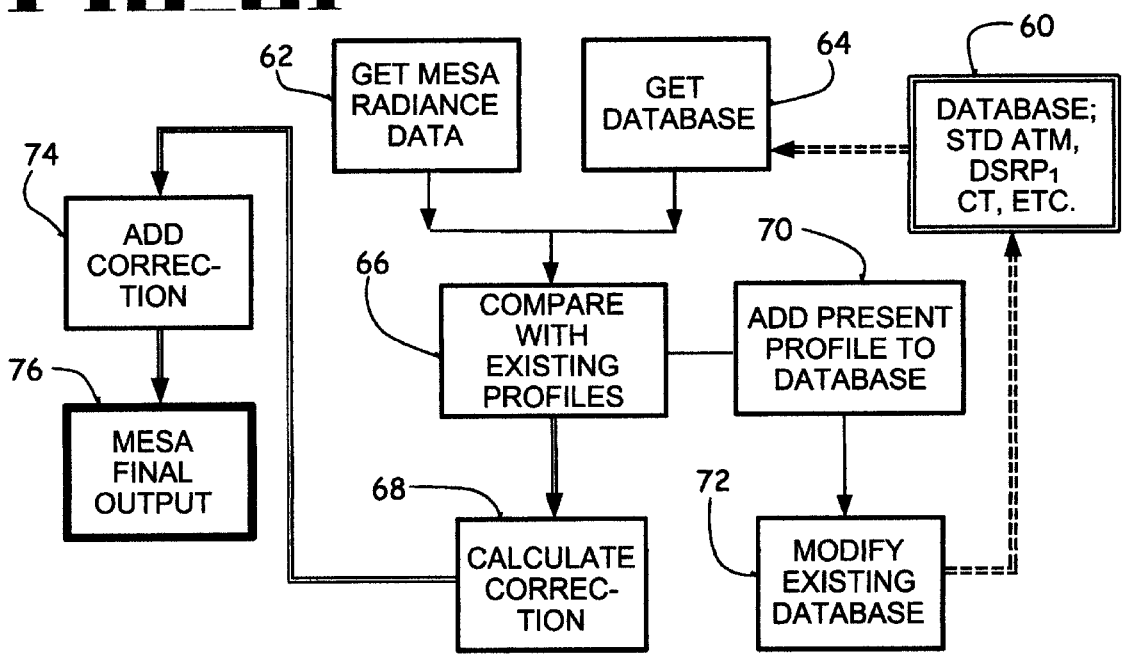
FIG_21

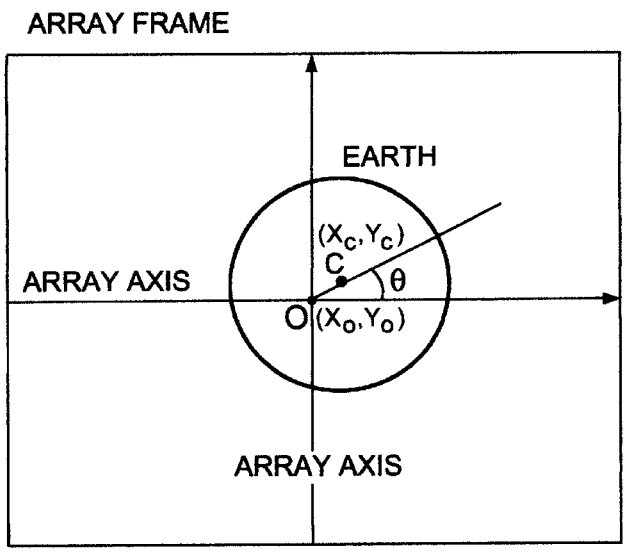
FIG_20
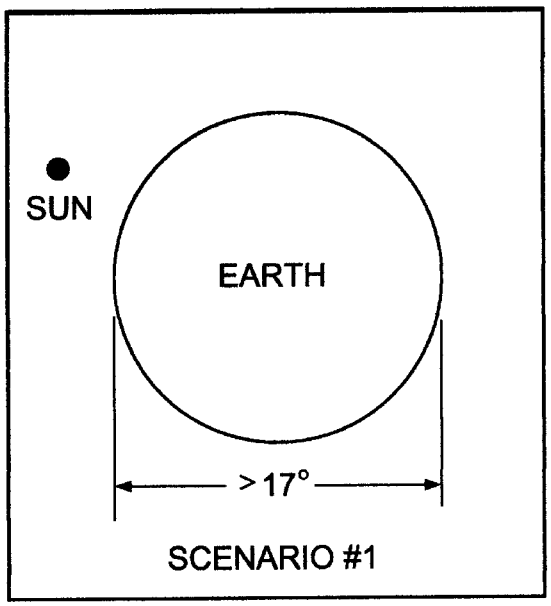
FIG_22
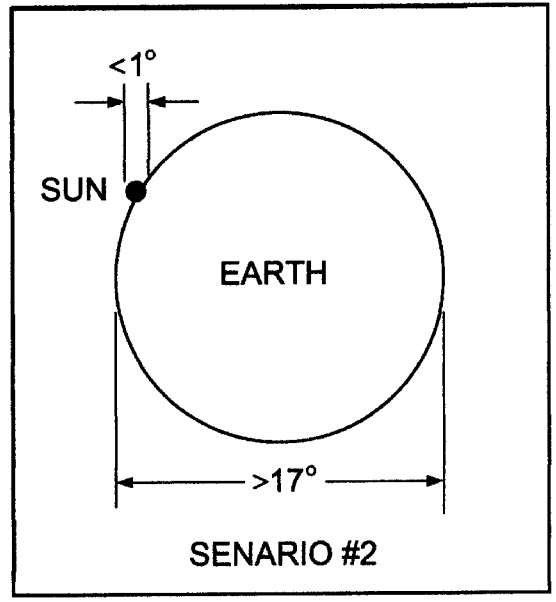
FIG_23

MICROBOLOMETER EARTH SENSOR ASSEMBLY

FIELD OF THE INVENTION

The present invention relates generally to three axis attitude determination of spacecraft. More particularly, the present invention relate to an earth sensor and method for determining the three axis attitude of orbital spacecraft.

BACKGROUND OF THE INVENTION

Spacecraft in orbit about the earth, such as artificial satellites, require means for attitude determination in order to maintain a desired three axis (roll, pitch and yaw) orientation relative to the earth.

Earth sensors are devices that are mounted to satellites for sensing the infrared radiation emitted by the earth and for producing a signal from which two axis attitude information (roll and pitch) of the satellite relative to the earth can be determined. Orientation of around the yaw axis is usually determined by other means, such as gyroscope, or the observation of other heavenly bodies.

Conventional earth sensors use an electromechanical mechanism, such as a chopper or scanning mirror, in combination with single element or linear array infrared detectors. Such scanning type earth sensors suffer from many disadvantages. First, in view of the electromechanical chopper or scanning mirrors are heavy and expensive to build and they are difficult to align and adjust. Further, the resonant frequencies of the known electromechanical scanning mechanisms react with spacecraft vibrations to cause error in the attitude determination. Further still, the single element infrared detectors used in such scanning type sensors are also expensive and they have a tendency for high incidence of qualification failure.

Another type of earth sensor uses thermopiles as the detective source for "staring" at the earth. Each thermopile consists of many individual thermal couples and the thermal couples are sensitive to temperature variation in the detector environment and between adjacent detectors.

In addition, accuracy of such starring type earth sensors is compromised by the limited amount of image information that the detectors generate due to their small field of view of the earth's limb.

A bolometer is a thermal detector in which the incoming radiation heats the detector, resulting in a temperature rise that is then sensed as a change in the element resistance. Recent advances in infrared detector technology incorporating silicon manufacturing processes have seen the practical development of imaging devices known as microbolometer detectors. A microbolometer detector is a two dimensional area array detector that has three very attractive features: a cost advantage inherent in its silicon manufacturing processes, the capability for chopperless dc coupled sensor, and the performance of microbridge detector structure. The microbridge structure of the microbolometer focal plane allows for much improved performance over conventional IR imagers since the microbridge can be fabricated with very low thermal conductance between pixels which eliminates thermal crosstalk between adjacent sensing elements, enabling near detector limited spatial resolution to be achieved. Microbolometer focal plane arrays with an array size on the order of 320×240 pixels have been fabricated directly on silicon read out electronics and have been demonstrated to achieve very sharp and crisp imagery characteristics.

To the inventors' knowledge, there are no known earth sensors which utilize the above-described microbolometer sensor technology for determining attitude information for orbital spacecraft. An earth sensor utilizing such microbolometer sensor technology and that also includes an input optics configuration and image processing means specially adapted to make optimum use of the full and crisp image detection capability of the microbolometer focal plane array would constitute a significant advance in the art.

SUMMARY OF THE INVENTION

Therefore, it is an object of the present invention to provide an earth sensor for determining attitude information about three axes for an orbiting spacecraft which is of low cost, high accuracy and which is insensitive to spacecraft vibrations.

It is another object of the present invention to provide an earth sensor for an orbiting spacecraft which uses a microbolometer two dimensional area array as the detective source and which is capable of generating full and crisp images of the entire earth for greater accuracy in attitude determination of the spacecraft.

It is another object of the invention to provide an earth sensor assembly of the type described that further includes a modular front end optic head assembly for collecting and focusing the radiant infrared (IR) energy onto the microbolometer area array, and wherein the optic head assembly is designed as a replaceable telescope module to permit interchangability with other telescope modules, each of which is configured to provide a desired field of view for a particular earth orbit mission, ranging from a relatively small field of view for medium earth orbit (MEO) and high or geosynchronous earth orbit (GEO) missions to a very large field of view for low earth orbit (LEO) missions.

In carrying out the above objects and other objects and features of the present invention a static two dimensional area array earth sensor assembly for an orbiting spacecraft is provided which uses a microbolometer detector as the detective source for capturing full or partial images of the earth. The microbolometer based earth sensor assembly (MESA) includes an input optic head assembly for collecting incident radiant power emitted from the earth and directing it to the focal plane of the microbolometer area array. The microbolometer detector includes readout electronics effective to convert the detected IR power into electric signals. Also included are data processing means for processing the signals generated by the readout electronics of the microbolometer detector to determine the attitude of the spacecraft relative to the earth.

In accordance with an advantageous feature of the invention, the input optic head assembly is constructed as a removable telescope module to permit interchangeability with other telescope modules, wherein each telescope module is separately configured to provide a desired field of view for a particular earth orbit mission, ranging from a relatively small field of view for medium earth orbit (MEO) and high or geosynchronous earth orbit (GEO) missions to a very large field of view for low earth orbit (LEO) missions.

Also disclosed is an algorithm for processing the earth image information generated by the microbolometer area array and for determining the three axis attitude (pitch, roll and yaw) of the spacecraft. Advantageous features of the algorithm include techniques for minimizing errors due to (1) earth radiance variations (i.e., variations in the earth's radiance due to seasonal changes and cloud effects) and (2) sun and moon intrusion. The algorithm can determine spacecraft attitude during the transfer orbit phase as well as the on-station phase of operation.

Structurally, the algorithm consists of many self-sufficient yet inter-related parts or modules. Each module performs a specific task. In earth attitude determination, complexity of the modules ranges from simple pitch and roll determination, to removing effects due to sun and moon intrusion, to heuristic self-adjusting of the earth sensor output to reduce/eliminate the variance of the earth's radiance.

The data processing is generally conducted in two stages. In the first stage, the stored earth limb (EL) data is quantized and normalized to reduce or eliminate effects such as those due to the earth radiance gradient and cloud. After this processing, the well-known method of centroiding and/or curve fitting may be utilized to calculate the earth center (thus the pitch, roll, and yaw) with high accuracy.

For a conventional (heritage) earth sensor, such as a scanning earth sensor, the intrusion of either the sun or moon into the image generally presents a significant reduction of the sensor pitch/roll accuracy. The reason for this is that heritage earth sensors are only able to gather a limited number of data points or data samples, thus resulting in a relatively small database from which the spacecraft attitude information is calculated. As an illustration, consider the typical operation of a heritage earth sensor having a scanning mirror with two scans. For each scan, there are two space-to-earth and two earth-to-space crossings per 'mirror' cycle. Combining the two scans of the earth sensor, the database for pitch/roll processing would consist of eight EL data per 'mirror' cycle. When the sun (or moon) intrudes into the field-of-view (FOV) of one of the detectors (thus one scan), situations arise where at least one half of the EL data of one scan is rendered either useless or contains a large bias. The result is a significant reduction of the available database and/or an imbedded bias error. In either case, there would be a significant degradation of the pitch/roll accuracy.

The situation is very different for the microbolometer area array detector (MBAAD) of the present invention. The very nature of the MBAAD provides a huge earth limb database available for processing. With the sun/moon intrusion, the space object must enter the MBAAD at one edge and only with an angular extent of about 0.5°. In comparison with the earth angle 17.4° at a geosynchronous orbit (and larger earth angles at lower earth orbits), the number of corrupted pixels would consist only a small portion of the EL database even when the sun/moon is near or at the limb. Sun or moon intrusion can be easily tracked by the MBAAD and processed out of the picture by the algorithm. Consequently, only an insignificantly small amount of the EL data becomes unavailable for the earth center determination with a very minor reduction of accuracy even if there is any.

The captured image of the earth possesses a large number of limb crossings. The data processing unit includes a database containing archival earth image information as well as continuously updated earth image information as generated by the MBAAD. The MBAAD selects those pixels containing the earth limb (EL) data and stores the EL data into memory. The subsequent processing (in single steps or a combination of many steps) of the EL data provides the output of the MESA in terms of the coordinates of the earth center (EC) so that the pitch, roll, and yaw of the spacecraft relative to the earth can be determined.

Methods and apparatus which incorporate the features described above and which are effective to function as described above constitute specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is a block diagram which illustrates the principle components and operation of the microbolometer earth sensor assembly of the present invention.

FIG. 2 is an isometric perspective view of a microbolometer earth sensor assembly constructed in accordance with one embodiment of the present invention adapted for medium earth orbit (MEO) and high or geosynchronous earth orbit (GEO) missions.

FIG. 3 is side elevation cross sectional view of the microbolometer earth sensor assembly shown in FIG. 2.

FIG. 4 is a schematic view of the front end reflective optics system of the MEO/GEO embodiment shown in FIGS. 2 and 3.

FIG. 5 is an isometric perspective view of a microbolometer earth sensor assembly constructed in accordance with another embodiment of the present invention adapted for low earth orbit (LEO) missions.

FIG. 6 is a schematic view of the front end reflective optics system of the LEO embodiment shown in FIG. 5.

FIG. 6A is a plot of earth angle as a function of spacecraft altitude (in nautical miles, N-mile).

FIG. 7 is an illustration of the detector array of the microbolometer area detector shown with a captured image of the earth.

FIG. 8 is an illustration which shows a close up view of a captured earth image on the detector array.

FIG. 9 is a schematic illustration of the type of signal response generated by the microbolometer area array detector for a fully acquired earth image.

FIG. 10 is a schematic illustration of the type of signal response generated by the microbolometer area array detector for a partially acquired earth image.

FIG. 11 is a schematic illustration of a series of various kinds of simplified radiance profiles of captured earth images.

FIG. 12 is a schematic diagram that illustrates the effect of a cloud on the radiance profile of a captured earth image.

FIG. 13 is a schematic diagram that illustrates the effect of radiance gradient on the radiance profile of a captured earth image.

FIGS. 14–17 are a series of schematic diagrams which illustrate the principles of the quantization of the radiance factor, $w_{jk}$, for reducing the sensitivity to cloud and radiance variation that may be present in the captured earth image data.

FIG. 18 is a schematic diagram which illustrates the principles of weighting factor normalization for reducing sensitivity to radiance variations at the earth limb in the captured earth image data.

FIG. 19 is a block diagram that illustrates the least squares method for determining the coordinates of the earth center in the captured earth image data.

FIG. 20 is a schematic diagram which illustrates the principle of the yaw determination feature of the present invention.

FIG. 21 is a block diagram that illustrates the steps of the heuristic self-adjustment feature of the image processing algorithm for eliminating or substantially reducing the effects of radiance variation on the attitude information output from the microbolometer earth sensor assembly.

FIGS. 22–23 illustrate two scenarios of sun (moon) intrusion in the detected image of the earth and its surroundings on the area array detector.

DETAILED DESCRIPTION OF THE PREFERRED EMBODIMENTS

A definition of terms as used in the following detailed description of the invention is provided below:

MESA=microbolometer based earth sensor assembly, the MESA captures the image of the earth and possesses a large number of limb crossings.

MBAAD=microbolometer area array detector.

FOV=field of view of the MBAAD.

IFOV=FOV of a pixel of the microbolometer detector array.

$(x_c, y_c)$=earth center relative to the microbolometer detector array.

TEA=top of earth atmosphere.

Hard Earth=earth, no atmosphere.

HEL=boundary edge (limb) of Hard Earth.

Limb=assigned earth boundary, is located between HEL and TEA.

Limb Crossing Angle, $\phi$=angle between x-axis and tangent to limb.

Interior Pixel=pixel whose (received) radiant power comes from the Hard Earth inside the HEL.

Scan=a full string of pixels over the columns (x) of a given row (y) of the MBAAD.

FIG. 1 is a block diagram which illustrates the major components of the microbolometer earth sensor assembly (MESA) 10 for determining the three axis attitude of an earth orbiting spacecraft (not shown) along three axis, in accordance with the present invention.

The MESA 10 includes an optic head assembly 12, a detector assembly 14, sensor electronics 16, a data processing unit 18 and a power supply (not shown). The MESA 10 is mounted on board an earth orbiting spacecraft (e.g., a satellite) with the optic head assembly 12 oriented facing the earth.

A general overview of the operation of the MESA is now described. Incident infrared (IR) energy emitted by the earth and deep space is collected by the optic head assembly 12. The optic head assembly 12 focuses and filters the IR signal and directs it to the detector assembly 14. The detector assembly 14 includes readout electronics that convert the IR signal into an electric signal (either current or voltage). The electric signal from the readout electronics of the detector assembly 14 is further processed by the sensor electronics 16. The final signal is sent to the data processing unit 18 which executes an algorithm to determine the spacecraft attitude with respect to earth. The sensor electronics 16 and processing unit 18 collectively provide processing means for determining spacecraft attitude information. The attitude information from the data processing unit 18 is then transmitted as output to the spacecraft computer (not shown).

A MESA 10 constructed in accordance with one embodiment of the present inventions is shown and described in FIGS. 2 and 3.

The optic head assembly 12 of the MESA 10 comprises a radiant power receiving telescope assembly which includes a primary mirror 20 and a secondary mirror 22. The secondary mirror 22 is preferably encased within or backed by a radiation shield 24 which protects the sensitive detector assembly 14 from direct line-of-sight space radiation. In addition, the effect of thermal disturbance from the sun on the focal plane and internal optics is minimized.

Conceptually, it is preferred to use a reflective optics telescope arrangement for the optical head assembly 12. A properly shaped primary mirror 20 is utilized as the main energy (power) collecting device. Radiant IR power incident on the primary mirror 20 is reflected to the secondary mirror 22 (of the proper configuration) to redirect the IR rays to the detector assembly 14 through a focusing lens and optical filter 26 which filters the radiant energy into a desired optical band.

The optic head assembly 12 mounts on top of casing 28 which forms an enclosure for the detector assembly 14, the sensor electronics 16 and data processing unit 18 (see FIG. 1). The casing 28 further includes a mounting flange 30 for mounting to the spacecraft (not shown).

The detector assembly 14 includes a microbolometer sensor 32 that is enclosed within a vacuum package 34. The vacuum package 34 is provided with a window 36 disposed facing the incoming radiant energy. A shutter mechanism 38 is located between the window 36 and the focusing lens/filter 26.

The microbolometer sensor 32 is an area array detector having a large focal plane array with a 320×240 element array as the preferred focal plane array size. Each pixel of the area array defines an individual sensing element. The microbolometer focal plane array is fabricated as a microbridge silicon wafer structure in accordance with monolithic device construction techniques and it can be fabricated with very low thermal conductance between pixels. A performance advantage of the microbridge device structure is that it eliminates thermal crosstalk between adjacent sensing elements, enabling near detector limited spatial resolution to be achieved. Readout electronics 40 for the microbolometer sensor are integrated with the focal plane array. A thermoelectric cooler 42 is used for keeping the microbolometer sensor 32 at a constant temperature.

The bottom portion of the casing 28 contains the various components of the data processing unit 18 including electronic motherboard and card plug-ins 44

Depending upon the mission requirements, the size of the field of view (FOV) of the input optics or optic head assembly 12 of the MESA 10 will be adjusted. For this reason, the optic head assembly 12 is preferably designed as a replaceable telescope module. Several different telescope modules may be provided, each having a combination of primary and secondary mirrors specially configured to provide a particular FOV, ranging from a relatively small FOV for medium earth orbit (MEO) and high or geosynchronous earth orbit (GEO) missions to a very large FOV for low earth orbit (LEO) missions. For the configurable FOV telescope modules of the present invention, a low earth orbit is defined as an orbital satellite altitude falling within a range of about 250 to about 1,200 nautical miles above the earth, a medium earth orbit is defined as an orbital satellite altitude falling within a range of about 1,200 to about 13,000 nautical miles above the earth, and a high earth orbit is defined as an orbital satellite altitude falling within a range of about 13,000 nautical miles up to a geosynchronous orbit of about 19,300 nautical miles or more above the earth.

For these different mission requirements, the main body of the MESA 10 consisting of the detector assembly 14, the sensor electronics 16 and the data processing unit 18 is to be kept intact with only the optic head assembly 12 being exchangeable. This concept of an exchangeable optical head not only reduces the manufacture complexity of the MESA 10 but also the cost.

FIG. 4 is a schematic diagram of a reflective optics telescope module configured to provide a relatively small FOV suitable for use in medium earth orbit (MEO) and high or geosynchronous earth orbit (GEO) missions. In this configuration, the primary mirror 20 is concave in shape. As shown in FIG. 4, a properly concave shaped primary mirror 20 is utilized as the main energy (power) collecting device. Radiant power incident onto the primary mirror 20 is reflected to a secondary mirror 22 (of the proper configuration) to redirect the rays through a filter for selecting the energy in the desired optical band before hitting the microbolometer focal plane.

For large FOV applications (i.e., for low earth orbit missions), we have found that the best results are obtained when the primary mirror is configured as a convex surface. FIG. 5 shows another embodiment of the MESA (designated by reference numeral 10') having an optic head assembly 12' configured specifically for low earth orbit (LEO) missions. Structural elements common to both the first embodiment for MESA 10 shown in FIGS. 2–3 and the second embodiment for MESA 10' of FIG. 5 are identified by identical reference numerals.

The optic head assembly 12' of the MESA 10' includes a convex primary mirror 20' and a concave secondary mirror 22'. While not specifically shown, it is understood that a radiation shield may also be provided to the back side of the secondary mirror 22' to protect the detector against direct line-of-sight radiation and to protect the optic head assembly 12' against thermal distortion.

As is best seen in the simplified schematic illustration of FIG. 6, a primary mirror 20' with a concave surface is very effective for reflecting extreme incident radiation to the secondary mirror 22'. This provides the MESA 10' with a very large FOV which is desirable for obtaining full earth image information at low earth orbits.

It is a well known fact that the angular extent of the earth as seen by an earth sensor, referred to as the 'earth angle', varies with the distance (or altitude) of the earth sensor (or spacecraft) relative to earth. FIG. 6A plots the earth angle as a function of spacecraft altitude (in nautical miles, N-mile). In general, the altitude at LEO ranges about from 250 to 1,200 N-miles with a large earth angle of about 95° to 138°. At a higher earth orbit, such as a MEO or GEO, the earth angle becomes smaller (i.e., less than 95°). Strictly speaking, GEO means geosynchronous orbit. In the context of this application, GEO is used to represent orbits higher than MEO.

The term 'incident angle' refers to the angle of a ray relative to the optical axis which dissects the FOV in any radial direction. The corresponding incident (ray) angle is just one-half of the earth angle. In the present invention, the range of incident angles for LEO is from 47.5° to 69° and the incident angles are less than 47.5° for MEO and GEO. Because margins must be allowed in the optics design, the angular ranges of the reflective optics would be about 40° to 75° (or 80°) for LEO and about 0° to 50° (or 55°) for MEO and GEO.

THE IMAGE PROCESSING ALGORITHM

The inventive method of the present invention employs an algorithm that makes maximum use of the advantages offered by the full earth image detection capability of the microbolometer area array detector (MBAAD). The algorithm enables determination of pitch, roll and yaw with high accuracy and also includes the capability to heuristically self-adjust the earth sensor output to reduce and/or substantially eliminate the effects due to the radiance variance of earth atmosphere. Depending on the mission requirements and the desired level of sophistication, the algorithm may be used either in its entirety or only in particular, relevant portions.

Referring to FIGS. 7–8, there is shown a diagram of the microbolometer detector array with a full earth image displayed thereon. Interior pixels of the detector array are those pixels that receive radiant power from the hard earth. The interior pixels are used to help define the boundary edge or limb of the hard earth (HEL).

As noted above, the incident radiant power received by the MBAAD varies constantly due to atmospheric changes such as the presence of clouds, seasonal and diurnal variations over latitude and longitude, limb brightening, etc. Other events such as the aforementioned sun or moon intrusion further add to the complication. Nevertheless, there are three basic signal patterns used for the MBAAD. These signal patterns are:

(1) earth fully acquired—where the earth image is completely captured by the MBAAD;

(2) earth partially acquired—where only a part of the earth image is captured on the MBAAD; and (3) no earth—where there is no earth image on the MBAAD. Subtypes of the signal pattern include sun/moon intrusion, presence of radiance gradient, and/or clouds, spikes, etc., to list just a few. For all these subtypes, the signal pattern for the MBAAD would vary. Literature on the various types of atmospheric radiance is plentiful and readily available.

FIGS. 9 and 10, respectively, illustrate two sample cases of the above noted signal patterns. On the left hand side of FIGS. 9 and 10, two scans (identified as scan #1 and scan #2) across the detector array are shown. A scan is defined as a full string of pixels over the columns (x) of a given row (y) of the MBAAD. The signal of the pixels corresponding to each scan are shown on the on the right hand side of FIGS. 9–10.

FIG. 9 shows the signal pattern under normal operating conditions where the earth is fully acquired and without the presence of sun or moon intrusion. For a given scan, there is either no signal (e.g., scan #1) which indicates no earth or an earth signal (e.g., scan #2) which indicates a clear space-to-earth and earth-to-space crossing. The signal of all the pixels is amplified and processed to determine the earth center (or pitch and roll), FIG. 10 shows the signal pattern of the MBAAD with the earth partially acquired at the lower left corner of the detector array. For the earth partially acquired case, the earth signal may appear at any place of the detector array, such as at one corner or along one side of the detector array.

FIG. 11 shows three much simplified radiance profiles for illustration purposes. Details such as limb brightening and curved profile at or near a limb are not shown.

EARTH LIMB DETERMINATION ALGORITHM

The earth limb is defined as the assigned earth boundary. There are many known methods for determining the earth limb. Exemplary earth limb determination methods include the fixed threshold method, the percentage of peak threshold method, and the adaptive slope threshold method.

In accordance with the threshold method, a threshold level (an assigned signal level) is first established. An earth signal which reaches this threshold level defines the position of the limb. Presence of cloud and/or radiance gradient affects the signal profile of the earth sensor. The net result is a deviation from the "undisturbed" or the so called "true" limb. For a fixed threshold method, the radiance gradient affects limb location in general. The presence of clouds affects the earth limb position only if clouding is present at or near the earth limb. Clouds and radiance gradient affect limb accuracy in a more general way for other limb determination methods such as the percentage of peak threshold method. For example, cloud at position of peak will change the threshold level.

FIGS. 12 and 13 are graphical depictions which illustrate the effects of cloud and radiance gradient on the determination of the earth limb in accordance with the fixed threshold method.

NORMALIZATION

Radiance from the earth atmosphere consists of seasonal as well as diurnal latitude and/or longitude variation. One form of the variance appears as the radiance gradient across the latitudes and/or longitudes. As noted above, this radiance gradient may significantly affect the limb positioning.

Normalization eliminates the cloud effect for the interior pixels of the MBAAD. Clouds generally represent a "dip" in the received radiance signal (for example, see FIG. 12). Based on the signal of the interior pixels, any significant dip in the signal may be removed. The result is an effective elimination of the cloud effect.

The normalization procedure is effective to smooth out the radiance gradient. Based on observed data of the interior pixel of the MBAAD for the earth, the "global" mean value of the earth signal (over the interior pixels) and the slopes across the longitudes and latitudes may be easily obtained. The mean value and the slopes are used accordingly to reassign (i.e., rescale) the signal value of the interior pixels as well as reassign the signal value of pixels located at or near the earth limb.

The earth center, $(x_c, y_c)$, is calculated by finding the centroid of the detected earth pixels. The earth center is calculated by either a simple centroiding method and/or by a more sophisticated curve fitting method such as the least squares method.

The centroiding method is essentially a method of determining a weighted average over the pixels of the MBAAD. Normalization and quantization are applied to the MBAAD output to reduce the sensitivity to the radiance of the earth's atmosphere. In accordance with the centroiding method the earth center is given by the equation:

$$x_c = \frac{\sum_{j,k} w_{jk} \cdot x_{jk}}{\sum_{j,k} w_{jk}}, \quad (1)$$

$$y_c = \frac{\sum_{j,k} w_{jk} \cdot x_{jk}}{\sum_{j,k} w_{jk}},$$

where:

$w_{jk}$ is the radiance weighting factor; and $(x_{jk}, yj_k)$ is the position of the (j,k)-th pixel.

Assignment of the radiance weighting factor, $w_{jk}$, is one of the key steps in the image processing algorithm to achieve the desired high accuracy for the MESA. The assignment of the weighting factor depends on the condition at earth limb and is closely tied to the earth limb determination. The weighting must maintain the integrity in finding the earth center but with reduced sensitivity to radiance variations (such as the seasonal and cloud induced variations) at the earth limb. Note that these requirements compete with one another.

WEIGHTING FACTOR QUANTIZATION ALGORITHM

With reference now to FIGS. 14–17, the quantization of the weighting factor, $w_{jk}$, will be described.

To reduce the sensitivity to cloud and radiance variation, it is desirable to quantize the weighting factor. The optimum quantization depends, among other factors, on the limb crossing angle $\phi$ (defined as the angle between the limb line and pitch, x-axis), the atmosphere height and the pixel size (expressed in terms of individual pixel field of view). The top of the earth atmosphere (TEA) is assigned to be about 100 km above sea level. At an altitude higher than this level, the radiance becomes so small and its effect is entirely negligible. In a geosynchronous orbit, the TEA of 100 km corresponds to an angular difference of $\delta\theta = 0.137°$ from the hard earth. The number of pixels covered by $\delta\theta$ is a function of the pixel size and the limb crossing angle $\phi$. For example, at a pixel size of 0.056° and a normal limb crossing ($\phi=90°$), the number of pixels at limb crossing is N=4, along the x-axis, compared with N=6 at a limb crossing angle $\phi=45°$.

Utilization of the number of pixels involved at limb crossing is one of the basic features for determining the weighting factor quantization. Pixels exceeding the hard earth boundary are always assigned the weighting of value 1.0 regardless of its measured radiant power. This assignment helps to reduce the sensitivity to effects such as cloud and/or any adverse radiance variation which may extend deep into the hard earth.

Performance may be enhanced by including an appropriate limb algorithm which is able to remove the effects of sun/moon intrusion and possibly also provide limb curve fitting.

In the preferred embodiment of the invention, there are a minimum of five (5) levels in the quantization of the weighting factor, $w_{jk}$, to keep the integrity of the earth center. An upper bound is imposed on $w_{jk}$ to reduce the sensitivity to radiance variations at the earth limb. FIG. 17 illustrates how quantization reduces sensitivity to radiance variance. At small variance in radiance, quantization reduces and/or substantially eliminates fluctuation. Quantization is similar to smearing of radiance variation.

NORMALIZATION OF RADIANCE WEIGHTING FACTOR

FIG. 18 illustrates how normalizing the radiance weighting factor, $w_{jk}$, for interior pixels reduces sensitivity to radiance variation. Assuming that the maximum number of pixels at the limb crossing region is N=6, the assignment of a constant value for $w_{jk}$ at all pixels beyond N=6 reduces/ eliminates cloud effects.

LEAST SQUARES METHOD

As an alternative to the centroiding method discussed above, the least squares method may be used to calculate the earth center, $(x_c, y_c)$. The least squares method is a well known method of data regression. It utilizes an over-determined set of data points to estimate the unknown parameters. This method is based on the criterion that the best estimate of the unknowns satisfies the condition that the sum of the square error of the data set is a minimum.

FIG. 19 shows a block diagram which illustrates the application of the least squares method to the present invention. The pixel data is retrieved from the MBADD at 50. In applying the least square method to the earth center calculation of the present invention, it is assumed that the limb data of the earth image forms the over-determined data system. The limb coordinates, $(x_j, y_j)$, are determined at 52. The desired unknown parameters are then calculated. In this case, the desired unknown parameters are the coordinates of the earth center, $(x_c, y_c)$ and the earth radius, R. By following the well-established procedures, matrix elements $(\alpha_{lm}, \beta_{lm})$ of the least square fitting algorithm can be easily calculated based on limb data. This is indicated at 54. Utilizing the matrix elements and solving the (matrix) equations gives the estimate of the earth center, $(x_c, y_c)$, and the earth radius, R. These calculations are indicated at 56 and 58, respectively.

YAW DETERMINATION

The MESA is also able to determine the yaw angle, $\theta$. As is seen in FIG. 20, the yaw determination involves identifying the offset of the earth center $(x_c, y_c)$ to the center $(x_o, y_o)$ of the detector frame of the MBAAD. For this application, two reference points are needed to provide a reference line. Rotation of this reference line with respect to the array x-axis (pitch axis) gives the rotation or yaw. For yaw determination, the earth center should be purposely offset to a location $C(x_c, y_c)$ other than the detector array center O (0, 0). By so doing, the line joining O (0, 0) and $C(x_c, y_c)$ defines the necessary reference line. Any rotational movement about an axis perpendicular to the array and through the point O can be detected by the movement of the earth center, $C(x_c, y_c)$. The yaw angle, $\theta$, defines the angle subtended by the reference line OC and the x-axis of the array (see FIG. 20) and any change in yaw, $\theta$, is obtainable by the rotation of the line OC.

HEURISTIC SELF-ADJUSTMENT ALGORITHM

FIG. 21 is a flow diagram which illustrates the heuristic self-adjusting capability of the three-axis spacecraft attitude determination method for continuously adjusting the output attitude information to reduce and/or substantially eliminate the variance of the earth radiance on the attitude determination. The center of the earth, $(x_c, y_c)$, is calculated and tracked over the seasons throughout the entire space mission. Essential features of the radiance variation over the seasons will be stored into memory and continuously called and adjusted. In calculating the earth center, this seasonal database and the adjustment factors shall be called and incorporated into the calculation.

In particular, the method involves maintaining a database of existing earth radiance data including standard atmosphere (std atm) data, diurnal and seasonal radiance profile (DSRP) data and a correction table (CT) of earth limb regions. This is indicated at 60. As the presently observed earth radiance data is generated by the MESA at step 62, existing earth radiance data is retrieved from the database at 64. The presently observed radiance data is then compared to the existing radiance data at 66. Using the correction table (CT) retrieved from the database, the radiance factor is corrected at 68 to account for the deviation of earth radiance as determined by the comparison at 66. The presently observed radiance data (or radiance profile) is added to the database at 70 and is also used to update and/or modify the data base at 72. At the same time, the calculated correction is added to the attitude determination of the MESA at 74 to provide the final output information at 76.

SUN SENSOR APPLICATION

An area array detector (hereafter, detector or array) has the capability of capturing the images of objects within a given region. The size of this region is determined by the FOV of the detector. By utilizing the concept of the optical front end with a large FOV, an object can be detected over a large region.

The sun (or moon) is a space object with an angular extension of about 0.5° diameter. Although the detector array device and spacecraft three-axis attitude determination method of the present invention has been described above in the context of an earth sensor, it is understood that area array detector device may also be used to detect the sun and thus used as a sun sensor.

The large FOV of the area array detector device provides the required space coverage for a sun sensor. Unlike the use as an earth sensor, the optics should be blurred (defocused) for the sun sensor application. This is because that if the image of the sun is not blurred, the small size of the sun (or moon) image may cause it to fall within one pixel thus restrict the resolution of the sun sensor to the size of one pixel. With the blurring of the optics so that the image of the sun covers more than one pixel, processing of these pixels (either by a centroiding or by limb detection algorithm) gives the center of the sun and therefore the Sun location.

SUN/MOON INTRUSION

The intrusion of the sun (or moon) in the detected image of the earth and its surroundings on the area array detector may be dealt with by either a rejection technique or by a tracing of trajectory technique.

FIG. 22 illustrates a first sun(or moon) intrusion scenario in which the sun (or moon) is not at or near the earth limb. In this case, there is a two target image. One large target is for the earth which is greater than about 17°) and the other small target is the sun (or moon) which is less than 1°. In accordance with the rejection technique, the pixel information for the small image can be discarded during processing. In accordance with the tracing of trajectory technique, the pixel information for the small image can be stored for use in predicting its future position. The predicted position is then ignored and only the earth limb information is processed.

FIG. 23 illustrates a second sun(or moon) intrusion scenario in which the sun (or moon) is located at the earth limb. In this case, there is a one target image with a large protrusion on the order of about 0.5° at the limb. In accordance with the rejection technique, all the pixel information where the sun is not at the limb can be used to exclude a 1° zone covering the sun(moon) protrusion region during processing. Alternatively, it is also possible to use the sun (moon) intensity data to exclude a 1° zone about the protrusion during processing.

APPLICATION FOR TRACKING A HOT FLYING OBJECT

Contrary to conventional earth sensors, the MESA of the present invention is able to capture any hot flying object (e.g. a launched missile) within its field of view. This feature provides a very interesting and attractive application in that the MESA may be used as an acquisition and tracking device to acquire and track a flying object with a thermal signature.

As long as the flying object is hot against its background so that there is a sufficient detectable signal-to-noise ratio, the detector is able to capture a clear image of the flying object. With the captured image, a data processing procedure similar to that of finding the earth center (or finding and tracking the Sun/Moon intrusion) can be used to define the angular location of the flying object relative to the sensor.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. A method of determining the attitude of a spacecraft in an orbit about the earth using an area array sensor on said spacecraft, said method comprising the steps of:

collecting infrared radiation emitted from the earth;

continuously projecting the collected infrared radiation as an image of the earth and its surroundings onto a two dimensional area array focal plane of the array sensor, the image containing information about the entire earth limb at low earth orbit, the area array focal plane comprising a plurality of pixels;

detecting pixels of the area array focal plane on which the image is formed;

selecting those pixels of the area array focal plane that contain information about an earth limb;

converting the selected pixels into a plurality of signals representing earth limb data;

calculating the x- and y-coordinates of the earth center of the detected earth image using the earth limb data; and determining as output information the attitude of said spacecraft with respect to the earth using the calculated earth center.

2. The method according to claim 1, wherein the step of calculating the earth center includes the steps of:

assigning a radiance weighting factor indicative of the radiance variation at the earth limb due to seasonal and cloud induced variations;

determining the centroid of the selected pixels in accordance with the formula:

$$x_c = \frac{\sum_{j,k} w_{jk} \cdot x_{jk}}{\sum_{j,k} w_{jk}},$$

$$y_c = \frac{\sum_{j,k} w_{jk} \cdot x_{jk}}{\sum_{j,k} w_{jk}},$$

wherein, $x_c$ is the x coordinate of the earth center;

$y_c$ is the y coordinate of the earth center;

$w_{jk}$ is the radiance weighting factor and $(x_{jk}, y_{jk})$ is the position of the (j,k)-th pixel;

determining a limb crossing angle for each selected pixel, the limb crossing angle defining the angle between a limb line and the pitch, x-axis; and quantizing and normalizing the radiance weighting factor in terms of the limb crossing angle, the atmosphere height and pixel size to reduce effects due to seasonal and cloud induced variations.

3. The method according to claim 2, which includes determining the yaw angle, θ, in accordance with the following steps:

identifying a reference center $(x_o, y_o)$ of the two dimensional area array focal plane;

measuring the offset OC between the reference center $(x_o, y_o)$ and the calculated earth center $(x_c, y_c)$; and using the measured offset OC as a reference line with respect to the x-axis of the area array focal plane to determine the yaw angle, θ, subtended by the reference line OC and the x-axis.

4. The method according to claim 2, which further includes the step of continuously adjusting the output information to substantially eliminate effects due to seasonal and diurnal radiance variation of the earth atmosphere, the step of continuously adjusting the output information includes the steps of:

maintaining a database of existing earth radiance data including standard atmosphere data, seasonal radiance profile data and a correction table of earth limb regions;

retrieving presently observed earth radiance data from the selected pixels of the area array focal plane;

comparing the presently observed earth radiance data retrieved from the selected pixels of the area array focal plane with the standard atmosphere data and seasonal radiance profile data from the database to determine a deviation in earth radiance;

correcting the radiance weighting factor using the correction table to account for the deviation of earth radiance as determined by the comparison of the presently observed earth radiance data with the standard atmosphere data and seasonal radiance profile data; and including the corrected radiance weighting factor in the calculation of the earth center.

5. The method according to claim 4, which further includes the steps of:

adding the presently observed earth radiance data to the database; and modifying the existing earth radiance data in said database to include the presently observed earth radiance data.

6. The method according to claim 1, wherein the step of calculating the earth center includes using the method of least squares, wherein:

the earth limb data forms an over-determined database; and the desired unknown parameters are the coordinates of the earth center $(x_c, y_c)$ and the earth radius, R.

7. A system for determining the three-axis attitude of a spacecraft in an orbit about the earth, comprising:

a) a microbolometer detector including an area array focal plane having a plurality of pixels for detecting incident infrared radiation;

b) input optics means for collecting infrared radiation emitted from earth and for projecting the collected infrared radiation as an image of the earth and its surroundings onto said area array focal plane, said image containig information about the entire earth limb at low earth orbit;

c) readout electronics in association with said microbolometer detector for converting the incident infrared radiation detected by said pixels of said area array focal plane into electric signals indicative of earth radiance data; and d) data processing means responsive to said earth radiance data for determining spacecraft attitude information.

8. The system according to claim 7, wherein said input optics means comprises a telescope module which includes a primary mirror for collecting incident infrared radiation and a secondary mirror for redirecting the collected infrared radiation received from said primary mirror to said area array focal plane.

9. The system according to claim 8, wherein said telescope module is removable from said system to permit replacement by another telescope module.

10. The system according to claim 8, wherein said input optics means further includes shield means for shielding said area array focal plane of said microbolometer detector against damaging line-of-sight space radiation.

11. The system according to claim 10, wherein said radiation shield means comprises a radiation shield provided to a backside surface of said secondary mirror.

12. In combination with a spacecraft attitude sensor having a two dimensional area array detector and which is mountable on a spacecraft and which determines roll/pitch/yaw angles of said spacecraft relative to a calculated earth center, an optic head assembly for collecting infrared radiation emitted from earth and for projecting the collected infrared radiation as an image of the earth onto a focal plane of said area array detector, said image containing information about the entire earth limb at low earth orbit, said optic head assembly comprising:

a) a reflective optics telescope module that is removably connectable to said sensor;

b) said reflective optics telescope module including:
 i) a primary mirror for collecting incident infrared radiation;
 ii) a secondary mirror for redirecting the collected infrared radiation received from said primary mirror to said focal plane of said area array detector; and
 iii) radiation shield means for shielding said focal plane of said area array detector from damaging line-of-sight space radiation.

13. The optic head assembly according to claim 12, wherein said radiation shield means comprises a radiation shield provided to a backside surface of said secondary mirror.

14. The optic head assembly according to claim 12, wherein:
a) said primary mirror is configured in a convex shape sufficient to collect and direct extreme angles of incident infrared radiation to said secondary mirror;
b) said extreme angles of incident infrared radiation falling within a range of angles of about 40° to about 75°.

15. The optic head assembly according to claim 12, wherein
said primary mirror is configured in a concave shape sufficient to collect and direct incident infrared radiation to said secondary mirror having an angle of incidence falling within a range of about 0° to about 50°.

16. A method of determining the attitude of a spacecraft in an orbit about the earth using an area array sensor on said spacecraft, said method comprising the steps of:
collecting infrared radiation emitted from the earth;
projecting the collected infrared radiation as a full image of the earth and its surroundings onto a two dimensional area array focal plane of the array sensor, the area array focal plane comprising a plurality of pixels;
detecting pixels of the area array focal plane on which the earth image is formed;
selecting those pixels of the area array focal plane that contain information about an earth limb;
converting the selected pixels into a plurality of signals representing earth limb data;
calculating the x- and y-coordinates of the earth center of the detected earth image using the earth limb data;
assigning a radiance weighting factor indicative of the radiance variation at the earth limb due to seasonal and cloud induced variations;
determining the centroid of the selected pixels in accordance with the formula:

$$x_c = \frac{\sum_{j,k} w_{jk} \cdot x_{jk}}{\sum_{j,k} w_{jk}},$$

$$y_c = \frac{\sum_{j,k} w_{jk} \cdot x_{jk}}{\sum_{j,k} w_{jk}},$$

wherein,
$x_c$ is the x coordinate of the earth center;
$y_c$ is the y coordinate of the earth center;
$w_{jk}$ is the radiance weighting factor and ($x_{jk}$, $y_{jk}$) is the position of the (j,k)-th pixel;
determining a limb crossing angle for each selected pixel, the limb crossing angle defining the angle between a limb line and the pitch, x-axis;
quantizing and normalizing the radiance weighting factor in terms of the limb crossing angle, the atmosphere height and pixel size to reduce effects due to seasonal and cloud induced variations; and
determining as output information the attitude of said spacecraft with respect to the earth using the calculated earth center.

17. The method according to claim 16, which includes determining the yaw angle, θ, in accordance with the following steps:
identifying a reference center ($x_o$, $y_o$) of the two dimensional area array focal plane;
measuring the offset OC between the reference center ($x_o$, $y_o$) and the calculated earth center ($x_c$, $y_c$); and
using the measured offset OC as a reference line with respect to the x-axis of the area array focal plane to determine the yaw angle, θ, subtended by the reference line OC and the x-axis.

18. The method according to claim 16, which further includes the step of continuously adjusting the output information to substantially eliminate effects due to seasonal and diurnal radiance variation of the earth atmosphere, the step of continuously adjusting the output information includes the steps of:
maintaining a database of existing earth radiance data including standard atmosphere data, seasonal radiance profile data and a correction table of earth limb regions;
retrieving presently observed earth radiance data from the selected pixels of the area array focal plane;
comparing the presently observed earth radiance data retrieved from the selected pixels of the area array focal plane with the standard atmosphere data and seasonal radiance profile data from the database to determine a deviation in earth radiance;

correcting the radiance weighting factor using the correction table to account for the deviation of earth radiance as determined by the comparison of the presently observed earth radiance data with the standard atmosphere data and seasonal radiance profile data; and including the corrected radiance weighting factor in the calculation of the earth center.

19. The method according to claim 16, which further includes the steps of:

adding the presently observed earth radiance data to the database; and modifying the existing earth radiance data in said database to include the presently observed earth radiance data.

* * * * *